C. B. TRESCOTT.
COOKING APPARATUS.
APPLICATION FILED MAY 24, 1916.
1,239,641.
Patented Sept. 11, 1917.
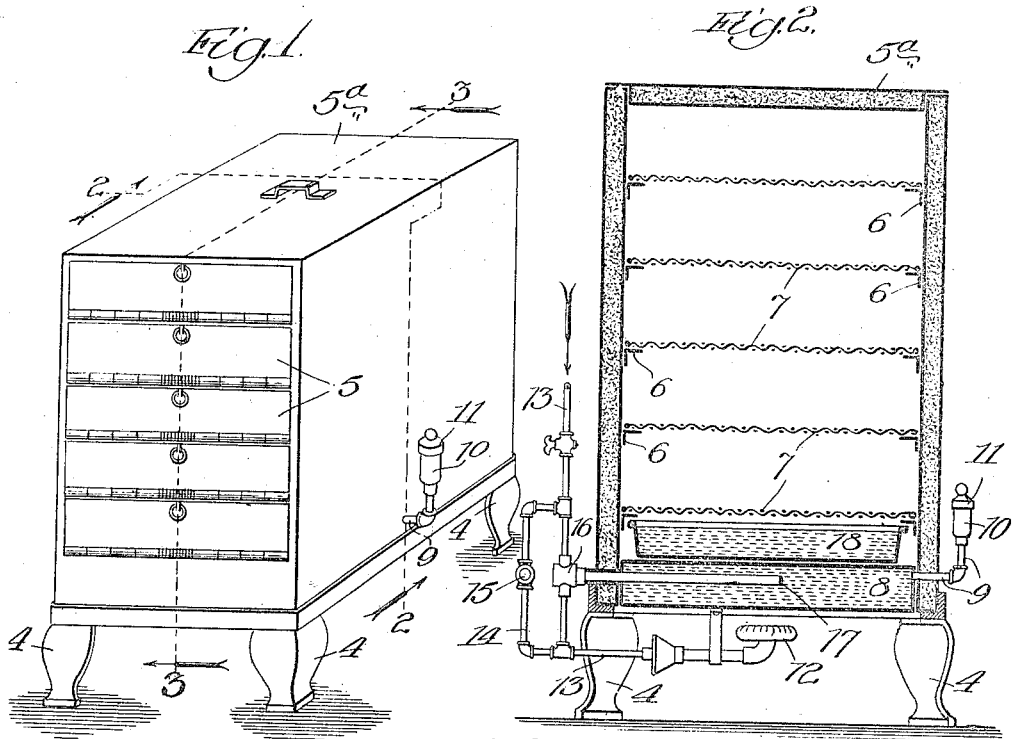
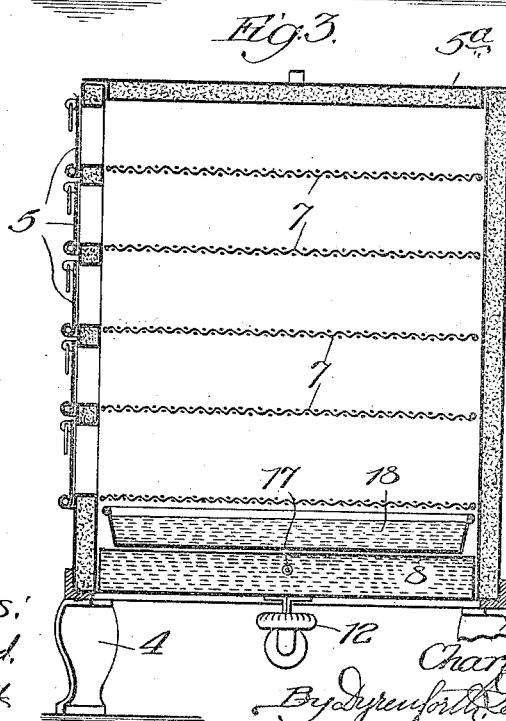

UNITED STATES PATENT OFFICE.

CHARLES B. TRESCOTT, OF CHICAGO, ILLINOIS.

COOKING APPARATUS.

1,239,641.

Specification of Letters Patent. Patented Sept. 11, 1917.

Application filed May 24, 1916. Serial No. 99,649.

*To all whom it may concern:*

Be it known that I, CHARLES B. TRESCOTT, a citizen of the United States, residing at Chicago, in the county of Cook and State of Illinois, have invented a new and useful Improvement in Cooking Apparatus, of which the following is a specification.

My invention relates to improvements in cookers to adapt them especially for low-temperature cooking, meaning cooking at temperatures below the boiling-point of water, with the advantage, in cooking meats (at a temperature of about 180° F.) of gradually breaking down the fibrous matter, preventing toughening and hardening of the albumen, and retaining the juices and natural flavor and practically the full value and weight of the raw meats, and with the advantage of retaining the natural flavors of vegetables, for cooking which the maximum temperature should be below 210° F.

The accompanying drawing illustrates a low-temperature cooking apparatus embodying my invention in a preferred form for cooking meats and vegetables and for baking bread, cakes and pastry.

In the drawing, Figure 1 is a perspective view of the cooker, and Figs. 2 and 3 are sections respectively on the lines 2—2 and 3—3, Fig. 1.

The apparatus is shown as a rectangular chamber supported on corner-legs 4 and having its sides, back and top walls formed double of sheet-metal and filled between the sheets with insulating material, such as asbestos, to retain the cooking heat in the chamber and prevent condensation of water-vapors on the inner wall surfaces. The front wall of the apparatus is a series of downwardly opening hinged and spring-closed doors 5, each formed double, like the other walls, of sheet-metal with insulating material filling the spaces. The top wall 5ª is shown as a removable cover, which is desirable for certain purposes in cooking, hereinafter referred to; though for most purposes the top wall may be a permanent or integral part of the structure. Ledges 6, which may be angle-bars, as represented, are provided at intervals along the opposite inner surfaces of the side-walls, to support wire-mesh shelves 7 for pans, or the like, employed for holding the matter undergoing cooking.

The bottom of the cooking chamber is preferably formed of a single metal sheet, and in the lower part of the cooking chamber and bearing against the bottom thereof I provide a tank or holder 8 for oil of a variety that will not boil under the temperatures employed in the cooking, and the boiling-point of which should be above 240° F. This oil-holder constitutes a principal feature of my improved apparatus. A pipe 9, which may serve as a filling-pipe, extends from the upper part of the holder through a side-wall of the chamber and is shown to terminate in a cup 10 to take care of the expansion of the oil, which should completely fill the holder and which circulates therein under the influence of the heat to which it is subjected. The cup may open to the atmosphere, if desired, though when provided with a cover 11, as illustrated, the showing may indicate a safety-valve for the escape of pressure above a predetermined degree.

A heater 12, which is preferably of the gas-fed variety, is supported to operate centrally under the chamber-bottom, and gas is supplied to it from a suitable source (not shown) through a valved pipe 13 having a by-pass 14 connected with it and containing a valve 15. A needle-valve 16, of ordinary kind, is interposed in the pipe 13 between the coupling-connections therewith of the by-pass; and this needle-valve is operated by a thermostat 17 extending into the oil-holder 8.

At 18 is shown a relatively narrow water-pan resting withdrawably on the oil-holder and serving the purpose hereinafter explained.

To operate the cooker, the gas is initially supplied to the burner by way of the by-pass on opening the valve 15, for heating the oil-content of the holder 8, which soon becomes so hot that it elongates the thermostatic rod to an extent causing it to close the needle-valve 16. The heat of the oil radiates from the holder throughout the chamber and heats the air therein to the temperature required for cooking—say about 180° F. for meats and about 200° to 210° F. for vegetables. Thereupon the valve 15 is closed, shutting off the gas supply until the temperature of the oil lowers sufficiently to cause the thermostat to open the needle-valve and again admit gas through the pipe 13 to the burner. In the meantime, the insulated walls of the chamber will have retained in the latter the required cooking temperature until the valve 16 opens, after which the thermostat will control the needle-valve to control admission of sufficient gas to the burner for maintaining such a temperature of the oil as will cause the heat radiated from the holder to hold the predetermined cooking temperature in the chamber.

As will be understood, the circulation of the heat-transferring oil in the oil-holder keeps the heat uniform throughout the oil-body; and the expansion of the latter is taken care of by the cup 10 to prevent bursting of the holder.

For cooking meats, vegetables, and the like, I employ the principle of the invention disclosed in my application for Letters Patent, Serial No. 26,530, filed May 7, 1915, of saturating the air in the cooking chamber with moisture as a vehicle for carrying the heat-units which attack the material undergoing cooking, with all of the advantages mentioned in said application. In the construction of the apparatus illustrated in the drawings herein, the materials to be cooked are in loosely-covered pans or containers supported on the shelves 7; and water in the pan 18 is evaporated by the heat from the holder 8, the vapors filling the cooking-chamber and saturating the heated air with moisture.

When it is desired to employ my cooker for making soup, boiling hams, and the like, the shelves 8 and pan 18 are not used, since the chamber has to be filled with water, so that instead of the doors 5 a wall like the rear wall is provided, and the top 5ᵃ is required to be removable, as represented, for introducing and withdrawing the hams, or the like, or the meat and the liquid or soup-stocks made from the meat. Sometimes meat used for this purpose is slightly tainted; but by providing the initial relatively high heat through the medium of the by-pass 14, as hereinbefore described, the resultant heat introduced into the chamber and maintained therein for a short period suffices to kill, in a few moments, the contaminating bacteria in the meat and render the latter wholesome, so that thereafter the cooking may proceed at the low temperature under control of the thermostat.

I realize that considerable variation is possible in the details of construction thus specifically shown and described, and I do not intend by illustrating a single specific or preferred embodiment of my invention to be limited thereto, my intention being in the following claims to claim protection upon all the novelty there may be in my invention as fully as the state of the art will permit.

What I claim as new and desire to secure by Letters Patent is:

1. A low temperature cooker comprising an oven, a heat-transferring liquid-holder within said oven, an open water-pan within said oven in heat-transferring relation to said heat-transferring liquid-holder whereby the heat from said holder will heat the water in said pan, means for heating said heat-transferring liquid-holder and its liquid-content to radiate the heat therefrom and to cause the air within the oven to be heated to a low cooking temperature, and thermostatic means in said liquid-content adapted to control said heating means.

2. A low temperature cooker comprising an oven, a heat-transferring liquid-holder within said oven containing a liquid having a boiling point above that of water, an open water-pan within said oven in heat-transferring relation to said heat-transferring liquid-holder, whereby the heat from said holder will heat the water in said pan, and means for heating said heat-transferring liquid-holder and its liquid-content to radiate the heat therefrom and to cause the air within the oven to be heated to a low cooking temperature.

CHARLES B. TRESCOTT.

Copies of this patent may be obtained for five cents each, by addressing the "Commissioner of Patents, Washington, D. C."